United States Patent
Zou et al.

(10) Patent No.: US 11,409,618 B2
(45) Date of Patent: Aug. 9, 2022

(54) TRANSACTION RECOVERY

(71) Applicant: International Business Machines Corporation, Armonk, NY (US)

(72) Inventors: Dian Guo Zou, Beijing (CN); Yan Zhou, Beijing (CN); Ze Zhang, Beijing (CN); Da Guang Sun, Beijing (CN); Shuo Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 17/019,676

(22) Filed: Sep. 14, 2020

(65) Prior Publication Data

US 2022/0083437 A1    Mar. 17, 2022

(51) Int. Cl.
*G06F 11/14*    (2006.01)
*G06F 16/23*    (2019.01)

(52) U.S. Cl.
CPC ...... *G06F 11/1471* (2013.01); *G06F 11/1474* (2013.01); *G06F 16/2379* (2019.01); *G06F 2201/80* (2013.01)

(58) Field of Classification Search
CPC ............. G06F 11/1471; G06F 11/1474; G06F 2201/80; G06F 2201/82; G06F 16/219; G06F 16/2358; G06F 16/2365; G06F 16/2379; G06F 16/24565
See application file for complete search history.

(56) References Cited

U.S. PATENT DOCUMENTS

| 7,730,489 | B1 | 6/2010 | Duvur | |
|---|---|---|---|---|
| 8,046,327 | B2 * | 10/2011 | Brodersen | G06F 16/278 707/615 |
| 9,417,977 | B2 | 8/2016 | Walter | |
| 9,436,553 | B2 | 9/2016 | Sadovsky | |
| 9,575,849 | B2 * | 2/2017 | Mittal | G06F 11/1469 |
| 10,049,130 | B2 | 8/2018 | Brooks | |

(Continued)

FOREIGN PATENT DOCUMENTS

EP    3198426 A1    8/2017

OTHER PUBLICATIONS

Levandoski et al., "Deuteronomy: Transaction Support for Cloud Data", 5th Biennial Conference on Innovative Data Systems Research (CIDR), Jan. 9-12, 2011, Asilomar, California, USA, 11 Pages.

(Continued)

*Primary Examiner* — Bryce P Bonzo
*Assistant Examiner* — Albert Li
(74) *Attorney, Agent, or Firm* — Stephen R. Yoder (57) ABSTRACT

Transaction recovery in a cloud computing environment. Transaction recovery includes determining whether a first container of a plurality of containers in the cloud computing environment is crashed. In response to the first container being crashed, the method may include determining at least one transaction log entry from a first log file corresponding to the first container. Transaction recovery includes retrieving at least one in-doubt transaction corresponding to the first container from a first database corresponding to the first container. Transaction recovery includes comparing the at least one transaction log entry with the at least one in-doubt transaction for transaction recovery.

19 Claims, 7 Drawing Sheets

(56) References Cited

U.S. PATENT DOCUMENTS

| | | |
|---|---|---|
| 10,599,728 B1* | 3/2020 | Shanmugam ........... H04L 67/42 |
| 10,761,946 B2* | 9/2020 | Bensberg ............ G06F 11/1474 |
| 2005/0114285 A1* | 5/2005 | Cincotta ............. G06F 11/2097 |
| 2008/0005220 A1 | 1/2008 | Tsunakawa |
| 2013/0151889 A1 | 6/2013 | Markus |
| 2013/0246368 A1 | 9/2013 | Parkinson |
| 2015/0172390 A1* | 6/2015 | Colrain ................ H04L 67/142 |
| | | 709/203 |
| 2016/0092319 A1 | 3/2016 | Parkinson |
| 2017/0351585 A1 | 12/2017 | Bourbonnais |
| 2019/0235974 A1* | 8/2019 | Pardon ............... G06F 11/2094 |

OTHER PUBLICATIONS

Mell et al., "The NIST Definition of Cloud Computing", National Institute of Standards and Technology, Special Publication 800-145, Sep. 2011, 7 pages.

* cited by examiner

TRANSACTION RECOVERY

BACKGROUND

The present invention relates to cloud computing technologies, and more specifically, to a method, system and computer program product for transaction recovery in a cloud computing environment.

Cloud computing environments, such as Kubernetes or other cloud computing environments, are widely used today. Containers are running in a cloud computing environment, and applications and application servers are running on these containers. An application server is a software framework that provides abundant facilities and a stable environment for applications running on the application server. An application may process business logic in which data may be inserted into or deleted from a database system.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to a first aspect of the present invention, there is provided a computer-implemented method. The method includes determining whether a first container of a plurality of containers in a cloud computing environment is crashed. In response to the first container being crashed, the method includes determining at least one transaction log entry from a first log file corresponding to the first container. The method further includes retrieving at least one in-doubt transaction corresponding to the first container from a first database corresponding to the first container. The method further includes comparing the at least one transaction log entry with the at least one in-doubt transaction for transaction recovery.

According to a second aspect of the present invention, there is provided a computer system. The computer system comprises a first component with a processing unit in a cloud computing environment and a memory coupled to the processing unit and storing instructions thereon. The instructions, when executed by the processing unit, perform actions of the computer implemented method described above.

According to a third aspect of the present invention, there is provided a computer program product comprising a computer-readable storage medium having program instructions embodied therewith. The program instructions are executable by a first component with a processor in a cloud computing environment to cause the processor to perform actions of the computer implemented method described above.

BRIEF DESCRIPTION OF THE SEVERAL VIEWS OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention. The various features of the drawings are not to scale as the illustrations are for clarity in facilitating one skilled in the art in understanding embodiments of the present invention in conjunction with the detailed description. The drawings are discussed forthwith below.

DETAILED DESCRIPTION

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
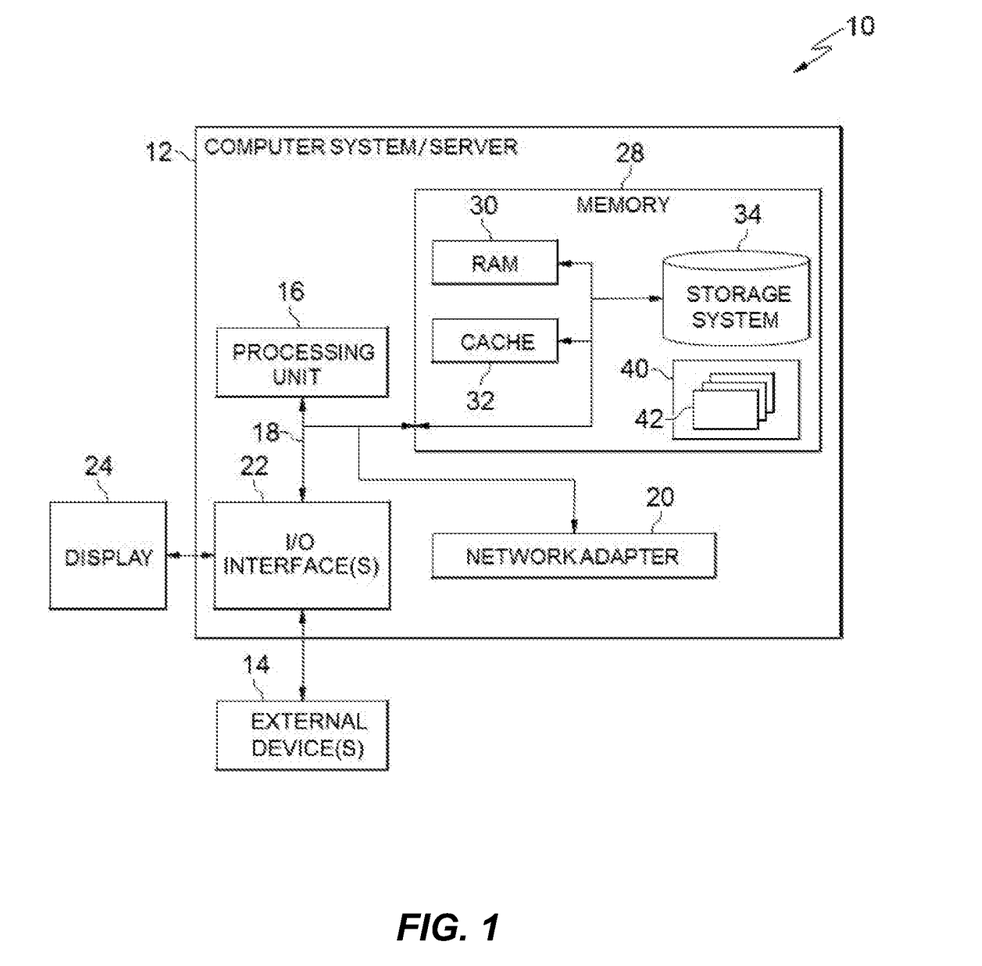
FIG. 1 depicts a cloud computing node according to some embodiments of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
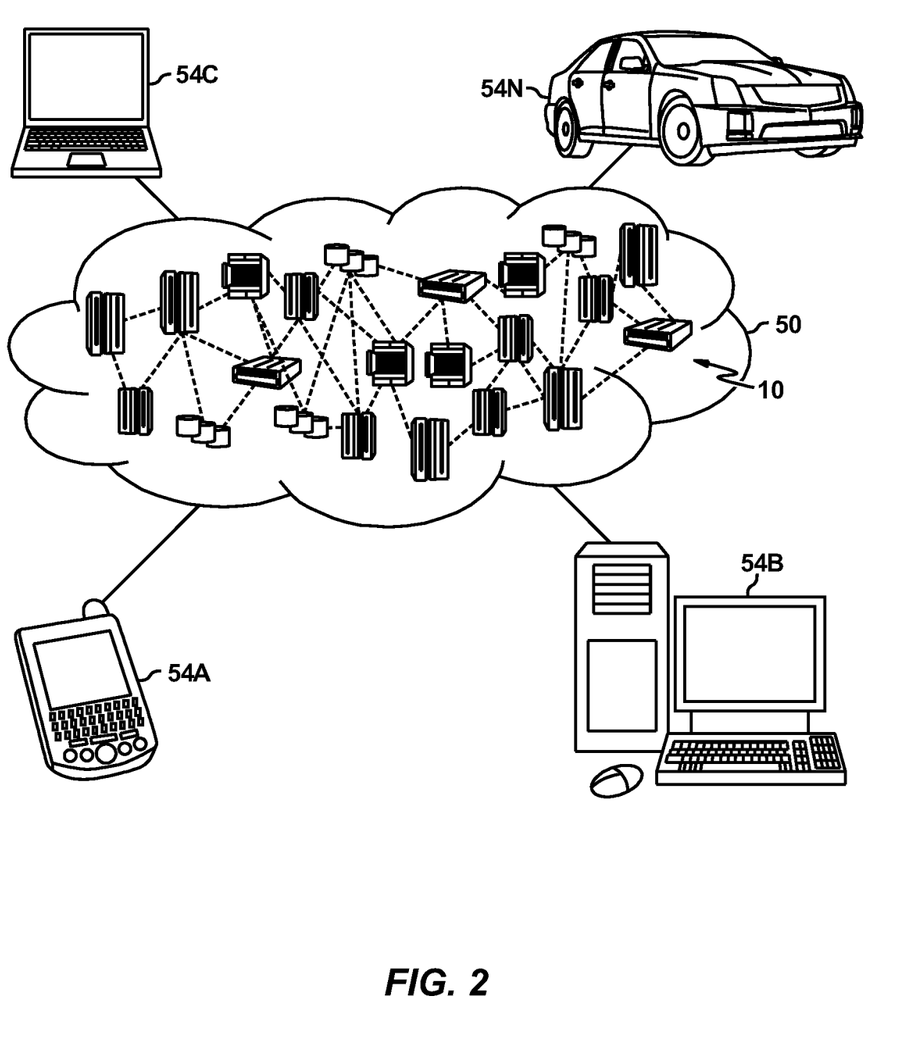
FIG. 2 depicts a cloud computing environment according to some embodiments of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
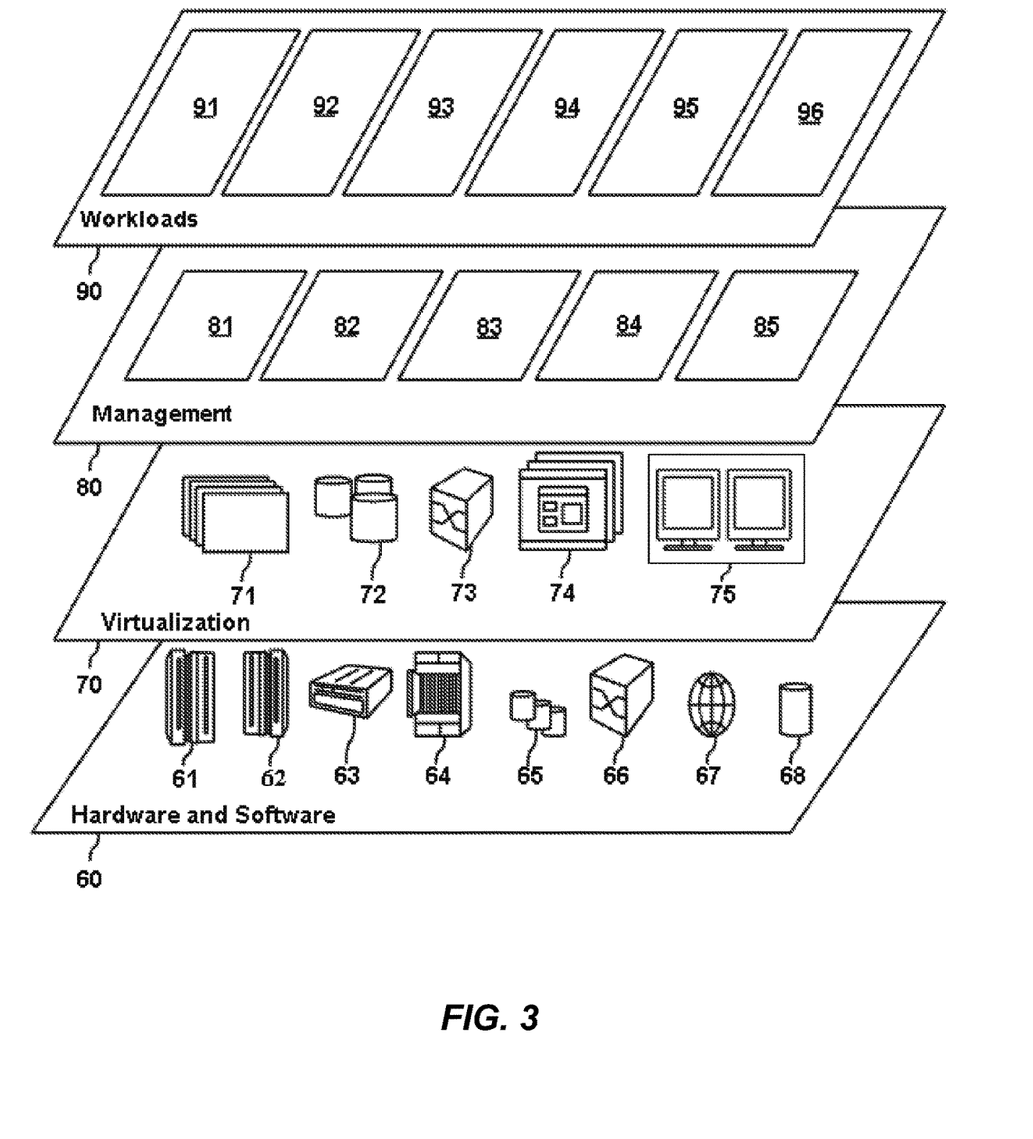
FIG. 3 depicts abstraction model layers according to some embodiments of the present invention.

Referring now to FIG. 3, a set of functional abstraction layers provided by cloud computing environment 50 (as shown in FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and transaction recovery 96.

An application can use a two-phase commit (2PC) protocol to handle a transaction, so that necessary data regarding to the transaction can be stored into a database system safely. A container on which the application is running may be crashed due to many reasons, such as, wrong logic in the application program, out of memory, virtual machine on which the container is running being crashed, and so on. Under such scenarios, the application is broken too. If the application is processing a transaction, it may result in a broken transaction from the applications server point of view or even an in-doubt transaction from the database system point of view. The in-doubt transaction has to be resolved, otherwise the result may be inconsistent. Furthermore, if the database lock is involved in by the in-doubt transaction, the database lock won't be released until the in-doubt transaction is resolved.

Figure 4:
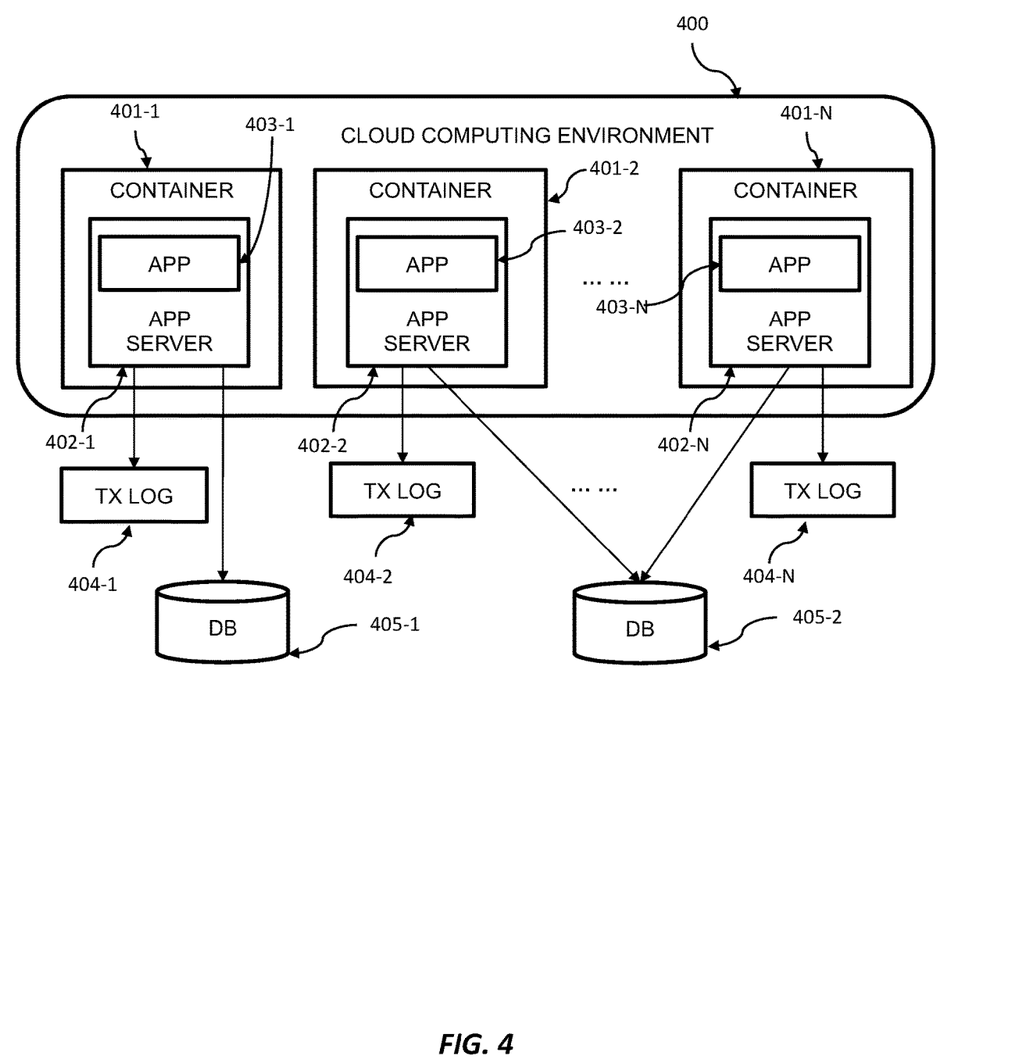
FIG. 4 depicts a schematic diagram of an exemplary cloud computing environment for processing transactions in accordance with an embodiment of the present invention.

FIG. 4 depicts a schematic diagram of an existing exemplary cloud computing environment 400 for processing transactions. Here a container means a container instance in a cloud computing environment, and a container instance is an instance of an image. Referring to FIG. 4, a plurality of containers, e.g. a container 401-1, a container 401-2, ..., a container 401-N (collectively referred to as containers 401 or individually referred to as container 401) are running in the cloud computing environment 400. A plurality of application servers, e.g. an application server 402-1, an application server 402-2, ..., an application server 402-N (collectively or referred to as application servers 402 or individually referred to as application server 402) and a plurality of applications, e.g. an application 403-1, an application 403-2, ..., an application 403-N (collectively referred to as applications 403 or individually referred to as application 403) are running on the containers 401 respectively. These application servers 402 may provide transaction frameworks, such as provide Application Programming Interfaces (APIs) for handling transactions to databases. Each application 403 may invoke these APIs and then each applications server 402 may handle transactions to a database, for example, the application server 402-1 may handle transactions to a database 405-1 and the applications server 402-2 to 402-N may handle transactions to a database 405-2. If an application server 402, such as application server 402-2, is crashed, a transaction to the database 405-2 corresponding to the application server 402-2 may be broken, which may lead to an in-doubt transaction in the database 405-2. In order to avoid broken transactions even in-doubt transactions, each application server 402 has its own transaction log file respectively, e.g. an transaction (TX) log file 404-1 corresponding to the application server 402-1, an transaction (TX) log file 404-2 corresponding to the application server 402-2, ..., an transaction (TX) log file 404-N (collectively referred to as TX log files 404 or individually referred to as TX log file 404) corresponding to the application server 402-N, configured on respective persistent components outside of the cloud computing environment 400, to record transaction log entries corresponding to each application server itself. Therefore, the application server 402-1 can access entries in the TX log file 404-1, the application server 402-2 can access entries in the TX log file 404-2, and so on, but the application server 402-1 cannot access entries in the TX log files 404-2 to 404-N.

In the following description, the container 401-2 is taken as an example to show a working process related to transaction log for each container. During the execution, if the application server 402-2 conducts transactions on the database 405-2, the application server 402-2 can store the transaction log entries to the transaction log file 404-2. If the container 401-2 is crashed, the broken transactions may occur, the cloud computing environment 400 has to wait the container 401-2 to be restarted and then the application server 402-2 can retrieve the transaction log entries from the transaction log file 404-2, and then the application server 402-2 can cooperate with the database system 405-2 by comparing in-doubt transactions corresponding to the container 401-2 in the database 405-2 with the transaction log entries to determine how to handle the in-doubt transactions. This is current working model for transaction recovery for application server 402-2 that running on the container 401-2 in cloud computing environment 400.

However, there are several drawbacks for the above existing implementation.

First, the restarting process for the container 401-2 may take some time, especially when the application 403-2 provides complex functions. This becomes worse if the restarting process for the container 401-2 needs to pull a new image, which may take a lot of time before the container 401-2 could be ready. State differently, the in-doubt transactions have to be suspended on the database 405-2 for several minutes, and database locks, if any, may exist on the database 405-2 for several minutes, all locked units could not be operated. Such scenario may block other containers to use the locked units and may cause other containers perform worse.

Second, the transaction log files for respective application servers should be configured on a storage, and files on a file system storing transaction log entries for different application servers should be different. In other words, different application servers should use different files in a storage to store their owned transaction log entries. However, there is no cloud computing environment providing such features, so it usually requires container developers to implement such logic, or a cloud system administrator has to be involved in to provide the additional maintenance work for this function.

Third, the cloud computing environment today can adjust the number of containers according to workload and resource usage in each container, so the number of containers in the cloud computing environment is dynamic, which make it more difficult for the container developers and the cloud system administrator to support such function.

Therefore, it is necessary to resolve the above problem in a cloud computing environment to provide automatic transaction recovery mechanism from the architectural level. It will be described in more detail below in combination with FIG. 5.

Figure 5:
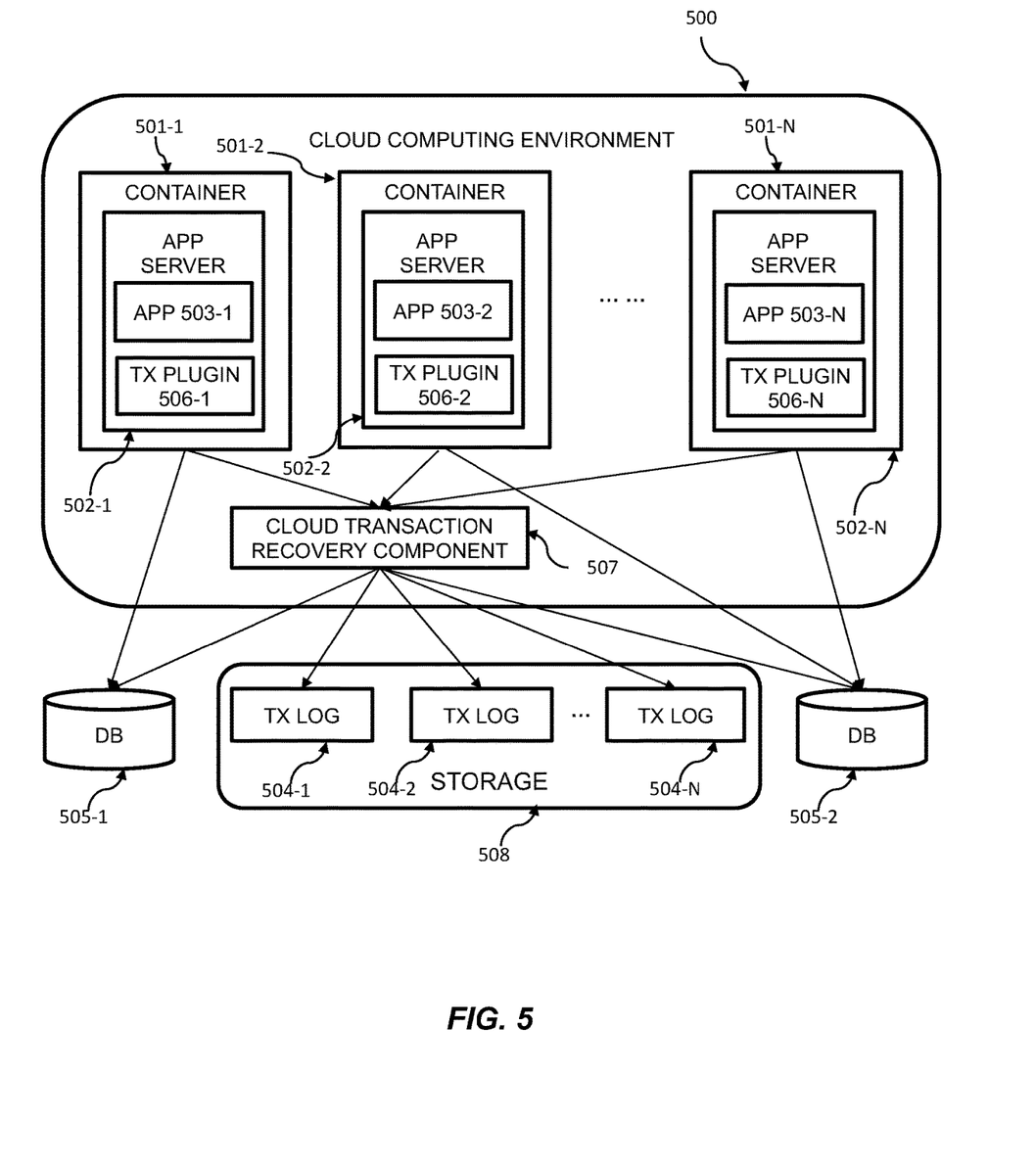
FIG. 5 depicts a schematic diagram of a proposed exemplary cloud computing environment for transaction recovery according to some embodiments of the present invention.

FIG. 5 depicts a schematic diagram of a proposed exemplary cloud computing environment 500 for transaction recovery according to some embodiments of the present invention. Now referring to FIG. 5, in the proposed exemplary cloud computing environment 500, a plurality of containers, e.g. a container 501-1, a container 501-2, ..., a container 501-N (collectively referred to as containers 501 or individually referred to as container 501) are running in the cloud computing environment 500. A plurality of application servers, e.g. an application server 502-1, an application server 502-2, . . . , an application server 502-N (collectively referred to as application servers 502 or individually referred to as application server 502) and a plurality of applications, e.g. an application 503-1, an application 503-2, . . . , an application 503-N (collectively referred to as applications 503 or individually referred to as application 503) are running on the containers 501 respectively. These application servers 503 may provide transaction frameworks, such as provide Application Programming Interfaces (APIs) for handling transactions to databases. Each application 503 may invoke these APIs and then each applications server 502 may handle transactions to a database, for example, the application server 502-1 handles transactions to a database 505-1 and the applications server 502-2 to 502-N handle transactions to a database 505-2 (The database 505-1 and database 505-2 are collectively referred to databases 505 or individually referred to as database 505). If an application server 502, such as application server 502-2, is crashed, transactions to the database 505-2 corresponding to the application server 502-2 may be broken, which may lead to in-doubt transactions in the database 505-2. In order to avoid the broken transactions or the in-doubt transactions, each application server 502 has its own transaction log file respectively, e.g. an transaction (TX) log file 504-1, an transaction (TX) log file 504-2, . . . , an transaction (TX) log file 504-N (collectively referred to as TX log files 504 or individually referred to as TX log file 504). As shown in FIG. 5, the transaction log files 504 are stored together in a storage 508 outside of each container 501 and also outside of the cloud computing environment 500. It can be appreciated that the storage 508 can be outside of each container 501 and but in the cloud computing environment 500. It can be also appreciated that the transaction log files 504 can be stored in different storages. The embodiment of using storage 508 is easy to be implemented and will be used as an example to describe the invention. Similar to the practice in FIG. 4, the application server 502-1 can access entries in the TX log file 504-1, the application server 502-2 can access entries in the TX log file 504-2, and so on, but the application server 502-1 cannot access entries in the TX log files 504-2 to 504-N.

Specifically, there is a component named transaction plug-in in each application server respectively, state from a different point of view, a transaction plug-in 506-1 is composed in the application server 502-1, a transaction plug-in 506-2 is composed in the application server 502-2, . . . , a transaction plug-in 506-N is composed in the application server 502-N. Moreover, a transaction recovery component 507 is composed in the cloud computing environment 500 but outside of each container 501. All components, either inside of the cloud computing environment 500 or outside of the cloud computing environment 500 are connected directly or indirectly via communication network (not shown in FIG. 5).

The communication network in FIG. 5 may include various types of communication networks, such as a wide area network (WAN), local area network (LAN), a telecommunication network, a wireless network, a public switched network and/or a satellite network. The communication network may include connections, such as wire, wireless communication links, or fiber optic cables.

Each component in the cloud computing environment 500 may be, for example, a mobile device, a telephone, a personal digital assistant, a netbook, a laptop computer, a tablet computer, a desktop computer, or any type of computing device capable of running a program and accessing a network. The cloud computing environment 500 may operate in a cloud computing service model, such as Software as a Service (SaaS), Platform as a Service (PaaS), or Infrastructure as a Service (IaaS). The cloud computing environment 500 may also be located in a cloud computing deployment model, such as a private cloud, community cloud, public cloud, or hybrid cloud.

The components with the same name in both FIG. 4 and FIG. 5, such as container, application, application server, database, transaction log file, have same functions, so their function will not be repetitively described for sake of brevity.

In the following description, the container 501-2 is taken as an example to show a working process related to transaction log for each container 501. When the container 501-2 is deployed or created in the cloud computing environment 500 and the application server 502-2 is deployed on the container 501-2, a transaction plugin 506-2 may be integrated in the application server 502-2, as well as in the container 501-2. The transaction plug-in 506-2 may add a hook to the application server 502-2 on the transaction log operations by utilizing existing interface or other known technologies to intercept transaction log requests in the application server 502-2. During processing a transaction, the application server 502-2 may trigger transaction log operations, such as send requests for writing a transaction log entry. Then the transaction plugin 506-2 may intercept those requests and redirect these requests to the cloud transaction recovery component 507. And transaction log entries may be composed in these requests. Other transaction plug-ins, such as the transaction plug-in 506-1, . . . , the transaction plug-in 506-N have the same functions with the transaction plugin 506-2. In this way, the cloud transaction recovery component 507 can take over any transaction log operations that triggered by any application servers 502 in any containers 501 of the cloud computing environment 500 automatically, and there is no need for developer to modify codes of the application servers 502 or applications 503 to introduce such functionality.

A transaction log request is triggered by an application server 502 on a container 501, is intercepted by a transaction plug-in 506 in the application server 502 and sent to the cloud transaction recovery component 507. From the cloud transaction recovery component 507 point of view, the transaction log request is from the container 501, no matter which application server 502 the transaction log request comes from.

Figure 6:
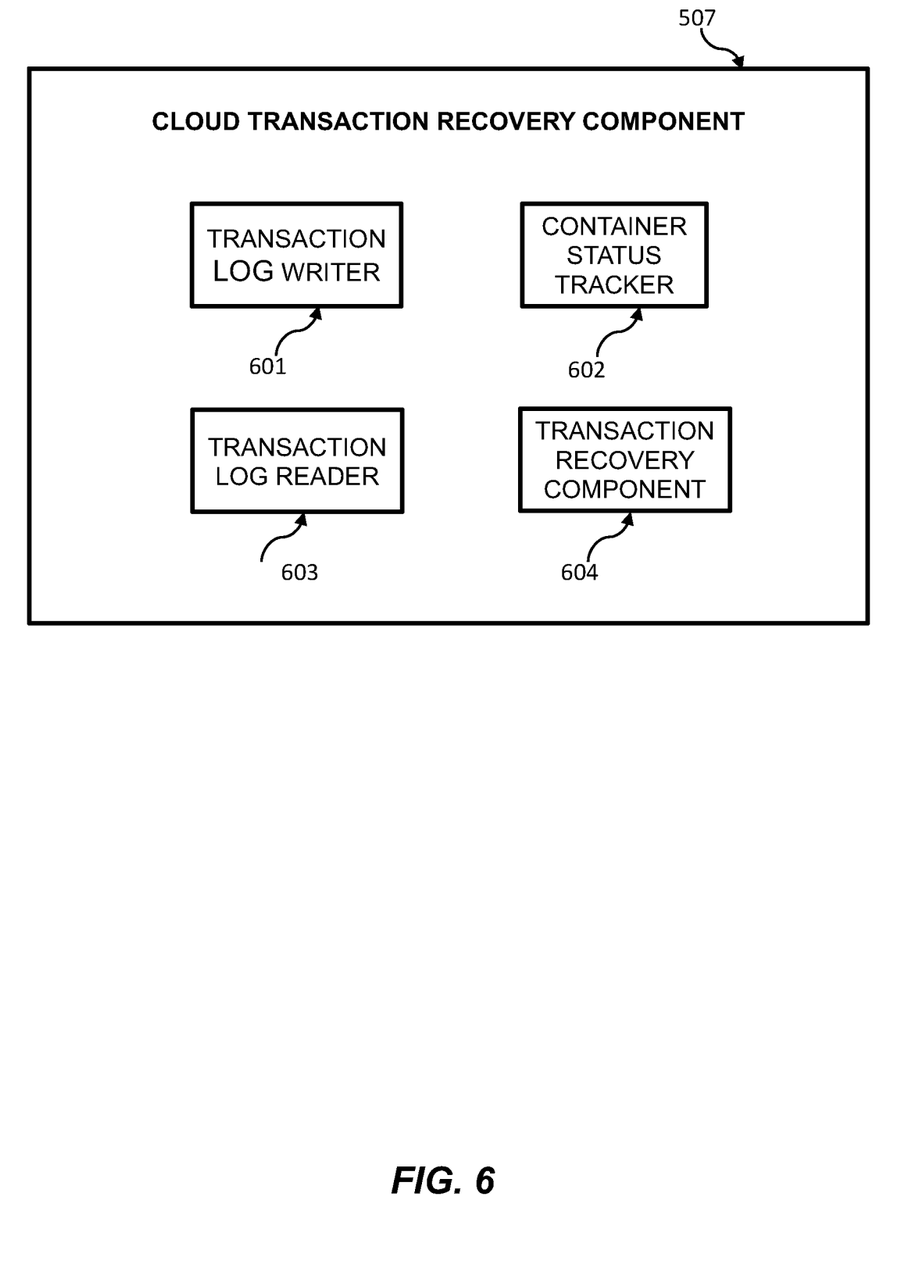
FIG. 6 depicts a schematic diagram of a proposed exemplary cloud transaction recovery component for transaction recovery in a cloud computing environment according to some embodiments of the present invention.

FIG. 6 depicts a schematic diagram of a proposed exemplary cloud transaction recovery component 507 for transaction recovery in a cloud computing environment 500 according to some embodiments of the present invention. FIG. 6 can be regarded as an implementation of the cloud transaction recovery component 507 in FIG. 5. It can be understood that the cloud transaction recovery component 507 can leverage other implementations.

Now referring to FIG. 6, the cloud transaction recovery component 507 comprises a transaction log writer 601, a container status tracker 602, a transaction log reader 603 and a transaction recovery component 604. In addition, the cloud transaction recovery component 507 may maintain a first mapping between each transaction log file 504 and each container 501 and a second mapping between each database resource 505 and each container 501. Functions of each components in FIG. 6 will be described in more detail below in combination with FIG. 5.

In some embodiments, the cloud system administrator may create each transaction log file 504 for each container 501 in the storage 508, as shown in transaction log files 504-1 to 504-N in FIG. 5. In addition, the cloud system administrator may create the first mapping between each transaction log file 504 and each container 501. Table 1 is an exemplary first mapping between each transaction log file 504 and each container 501. As shown, Table 1 may record the first mapping by recording each container ID/name in the cloud computing environment 500 and the path and file name of corresponding created transaction log file 504.

TABLE 1

| Container ID | Path and file name of transaction log file |
| --- | --- |
| ID of Container 501-1 | Path and file name of transaction log file 504-1 |
| ID of Container 501-2 | Path and file name of transaction log file 504-1 |
| ... | ... |
| ID of Container 501-N | Path and file name of transaction log file 504-N |

Further, the cloud system administrator may create the second mapping between each database 505 and each container 501. Table 2 is an exemplary second mapping between each database resource 505 and each container. As shown, Table 2 may record the second mapping by recording each container ID/name in the cloud computing environment 500 and the resource of database 505 accessed by the corresponding container 501. The database resource in Table 2 can include database name, username, password, and the like. Alternatively, the database resource can be a created database connection, which can be directly used by the transaction recovery component 507 to save time to build a connection to the corresponding database 505.

TABLE 2

| Container ID | DB resource |
| --- | --- |
| ID of Container 501-1 | DB1 resource |
| ID of Container 501-2 | DB2 resource |
| ... | ... |
| ID of Container 501-N | DB2 source |

Those skilled in the art may understand that the schemas of both the first mapping and the second mapping are just for illustrative purpose, other columns can be added to the Table 1 or Table 2. Further, it should be understood that the aforementioned tables are only implementations to represent the first or second mappings, other data structures can be used to represent the first and the second mappings, such as XML file, text file, and the like. This implementation (cloud system administrator creates mappings) is suitable for the scenario that the number of containers 501 in the cloud computing environment 500 is static. Because if the number of containers 501 in the cloud computing environment 500 is dynamic, the cloud system administrator cannot create transaction log file, as well as the first and second mappings, accordingly.

In some embodiments, when a first transaction log request redirected from the transaction plug-in 506-2 running on the container 501-2 is received by the cloud transaction recovery component 507, the transaction log writer 601 may create a transaction log file 504-2 for the container 501-2 in the storage 508, as shown in FIG. 5. The transaction log file 504-2 would be used to persist the transaction log entries. In addition, the transaction log writer 601 may create an entry to record the first mapping between the container 501-2 and the created transaction log file 504-2, as shown in Table 1. Also, the transaction log writer 601 may create another entry to record the second mapping between the container 501-2 and a corresponding database 505 resource by parsing the first transaction log request to determine the corresponding database 505 resource, as shown in Table 2. This implementation is suitable for the scenario that the number of containers 501 in the cloud computing environment 500 is dynamic since both the transaction log file 504 and the first and the second mappings are created on demand Thus, even the cloud computing environment 500 scales up and a new container 501 is deployed, this implementation can still support the transaction recovery functionality.

In some embodiments, After the transaction log files 504, the first and the second mappings are created, when the transaction plug-in 506-2 redirects a request from the container 501-2 for writing a transaction log entry into corresponding transaction log file 504, the transaction log writer 601 may receive the request and then check the first mapping to get the corresponding transaction log file 504-2, then write the transaction log entry into the transaction log file 504-2.

In some embodiments, if the application server 502-2 requests to read transaction log entries, the transaction plug-in 506-2 may redirect the request to the cloud transaction recovery component 507. The transaction log reader 603 in the cloud transaction recovery component 507 may receive the request and check the first mapping to get the corresponding transaction log file 504-2. The transaction log reader 603 may then read the transaction log entries from the transaction log file 504-2 and send the transaction log entries to corresponding container 501.

In some embodiments, as the cloud transaction recovery component 507 is a cloud native component of the cloud computing environment 500, the cloud transaction recovery component 507 can detect other container status easily via the container status tracker 602 using existing technologies, such as heartbeat and the like, so if any container 501 in the cloud computing environment 500 is crashed, the container status tracker 602 may know that immediately.

In some embodiments, if the container 501-2 in the cloud computing environment 500 is crashed according to the container status tracker 602, the cloud transaction recovery component 507 may handle the transaction recovery progress immediately. Specifically, the transaction recovery component 604 in the cloud transaction recovery component 507 may first call the transaction log reader 603, which may check the first mapping and get the corresponding transaction log file 504-2 for the crashed container 501-2 and then get at least one transaction log entry in the transaction log file 504-2 to the transaction recovery component 604. Then the transaction recovery component 604 may check the second mapping to get the database 505-2 resource corresponding the crashed container 501-2, and then retrieve a list of in-doubt transactions from the corresponding database. The transaction recovery component 604 may then get at least one in-doubt transaction from the crashed container 501-2. The transaction recovery component 604 may compare the at least one transaction log entry for the crashed container 501-2 from transaction log file 504-2 with the at least one in-doubt transaction for the crashed container 501-2 from the database 505-2, and then determine how recover the transactions, such as commit or rollback, using existing technologies. In this way, the at least one in-doubt transaction may be resolved in very short time before the crashed container is restarted. The transaction recovery component 604 may then delete the at least one transaction log entry from transaction log file 504-2 corresponding to the container 501-2 after the at least one in-doubt transaction is recovered.

In some embodiments, during the transaction recovery component 604 retrieves the list of in-doubt transactions from database 505-2 to get the at least one in-doubt transaction for the crashed container 501-2, the transaction recovery component 604 may first create the database connection based on the database 505-2 resource in the second mapping and then retrieves the list of in-doubt transactions from database 505-2 so as to get the at least one in-doubt transaction for the crashed container 501-2.

If the container 501-2 in the cloud computing environment 500 is crashed, the container 501-2 would restart automatically. As it may spend some time for the container 501-2 to restart, the in-double transaction may be resolved using the above cloud computing environment 500 and the cloud transaction recovery component 604 during this time. After the container 501-2 that running application server 502-2 is restarted, the application server 502-2 may continue to work as general.

Figure 7:
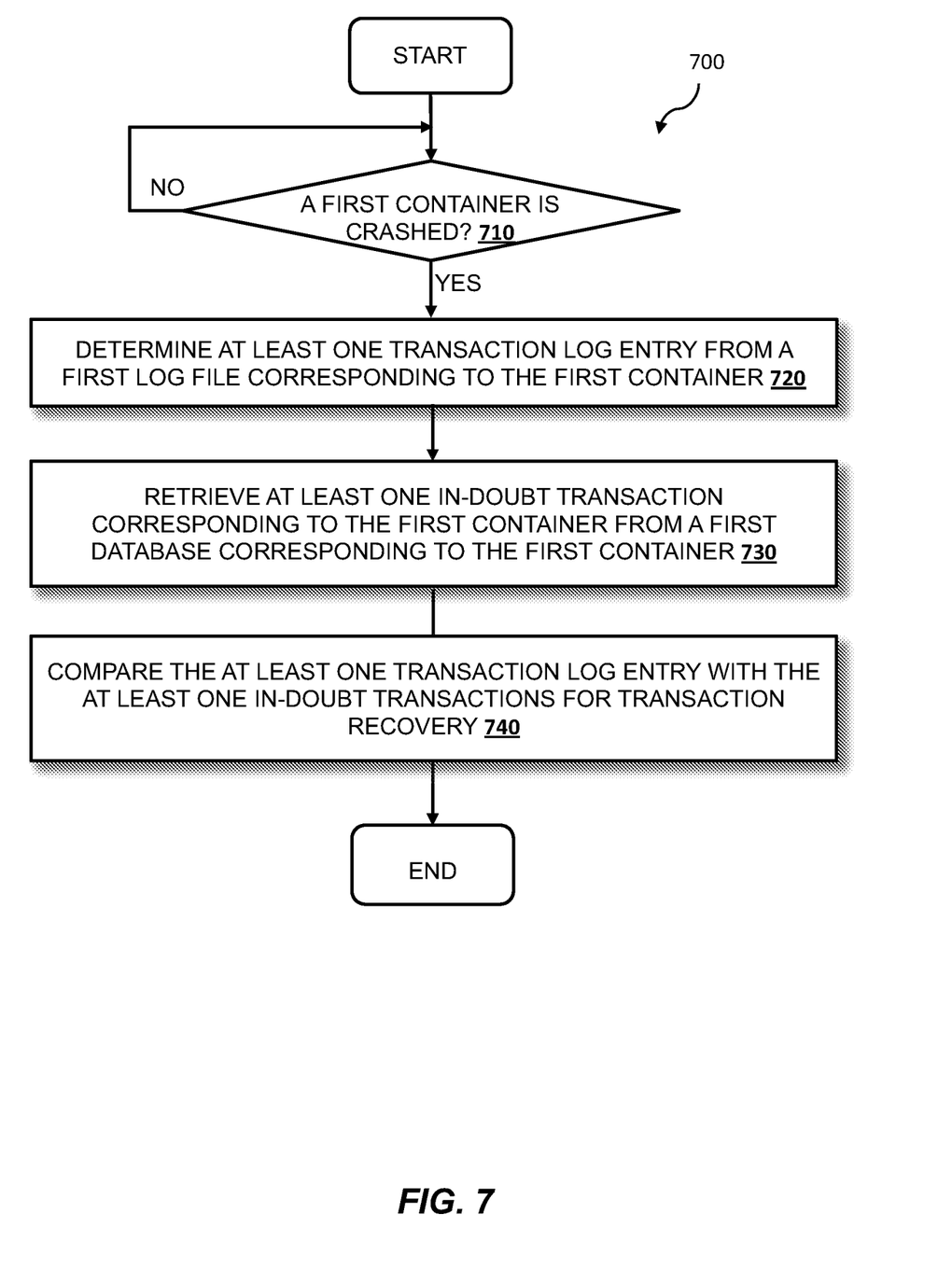
FIG. 7 depicts a flowchart of an exemplary method for transaction recovery in a cloud computing environment according to some embodiments of the present invention.

FIG. 7 depicts a flowchart of an exemplary method 700 for transaction recovery in a cloud computing environment according to some embodiments of the present invention.

The method 700 may be implemented by the cloud transaction recovery component 507, or other suitable computer/computing systems, which is referred to as a first component in the cloud computing environment 500. For ease of understanding, the method 700 will be described with reference to FIG. 5.

At 710, the cloud transaction recovery component 507 (a first component) may determine whether a first container of a plurality of containers in the cloud computing environment 500 is crashed.

In some embodiments, there is a second component, e.g. transaction plug-in 506, in each container 501 in the cloud computing environment 500, each second component 506 adds a hook on transaction log requests from each container 501 and redirect the transaction log requests to the cloud transaction recovery component 507. The cloud transaction recovery component 507, as a native component in the cloud computing environment 500, can track status of each container 501.

In some embodiments, the method further comprises a step (not shown in FIG. 7) of recording respective transaction log entries redirected by respective second components 506 in respective containers 501 into respective transaction log files 504 corresponding to respective containers 501, all the respective log files 504 are stored in a storage.

In some embodiment, each transaction log file 504 corresponding to each container 501 is created by the administrator of the cloud computing environment 500, and a first mapping between respective containers 501 and respective transaction log files 504 and a second mapping between respective containers 501 and respective database 505 resources are also created by the cloud system administrator of the cloud computing environment 500.

In some embodiment, each transaction log file 504 corresponding to each container 501 is created by the cloud transaction recovery component 507 in the cloud computing environment 500, and the first mapping between respective containers 501 and respective transaction log files 504 and the second mapping between respective containers 501 and respective database 505 resources are also created by the cloud transaction recovery component 507 in the cloud computing environment 500 when the cloud transaction recovery component 507 receives a first transaction log operation related to each container 501. This implementation may adapt to a scenario that the number of containers 501 in the cloud computing environment 500 are dynamic.

In some embodiments, if the cloud transaction recovery component 507 receive a request for recording a transaction log entry from a container 501, the cloud transaction recovery component 507 may determine a transaction log file 504 corresponding to the container 501 based on the first mapping and then record the transaction log entry to the corresponding transaction log file 504. In this way, operations for transaction log writing can be processed by the cloud transaction recovery component 507 after being redirected by the second component in the second container.

Referring back to FIG. 7, at 720, in response to a first container being crashed, the cloud transaction recovery component 507 may determine at least one transaction log entry from a first log file corresponding to the first container. In order to implement step 720, the cloud transaction recovery component 507 may determine the first log file corresponding to the first container based on the first mapping and then read the at least one transaction log entry from the first transaction log file. All transaction log entries are related to active transactions, which is known by those skilled in the art.

At 730, the cloud transaction recovery component 507 may retrieve at least one in-doubt transaction from a first database corresponding to the first container. In order to implement the step 730, the cloud transaction recovery component 507 may determine the first database corresponding to the first container based on a second mapping, then retrieve a list of in-doubt transactions from the first database, and finally determine the at least one in-doubt transaction corresponding to the first container. How to determine the at least one in-doubt transaction corresponding to the first container from the list of in-doubt transactions from the first database is well known by those skilled in the art, so the detailed description is omitted herein.

At 740, the cloud transaction recovery component 507 may compare the at least one transaction log entries with the at least one in-doubt transaction for transaction recovery using existing technologies. After comparing the at least one transaction log entry with the at least one in-doubt transaction, a final decision, such as "commit" or "rollback", can be made by the cloud transaction recovery component 507 to the database so as to recover the at least one in-doubt transaction. This is well known by those skilled in the art and detailed implementation is omitted herein.

In some embodiments, after the at least one in-doubt transaction is recovered, the cloud transaction recovery component 507 may delete the at least one transaction log entry from a first log file corresponding to the first container. In this way, after the first container re-starts, the application server and the application in the container may work normally.

The proposed method can make it easier from architectural level to recover in-doubt transactions conducting by a crashed container in a cloud computing environment. In addition, it is easier for developers to develop framework for transaction recovery in a cloud computing environment using the proposed method.

It should be noted that the processing of transaction recovery in a cloud computing environment according to embodiments of the present invention could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform certain embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining, by a first component with one or more processors in a cloud computing environment, whether a first container of a plurality of containers in the cloud computing environment is crashed;
   in response to the first container being crashed:
      determining, by the first component, at least one transaction log entry from a first log file corresponding to the first container;
      retrieving, by the first component, at least one in-doubt transaction corresponding to the first container from a first database corresponding to the first container; and
      comparing, by the first component, the at least one transaction log entry with the at least one in-doubt transaction to determine a transaction recovery action;
   wherein respective second components in respective containers of the plurality of containers:
      add a hook on transaction log requests from the respective containers; and
      redirect the transaction log requests to the first component.

2. The method of claim 1, further comprising:
   recording, by the first component, respective transaction log entries redirected by respective second components in respective containers into respective transaction log files corresponding to respective containers, the respective log files being stored in a storage.

3. The method of claim 2, wherein the recording respective transaction log entries redirected by respective second components in respective containers into respective transaction log files corresponding to respective containers comprises:
   creating, by the first component, the respective transaction log files corresponding to respective containers in the storage;
   creating, by the first component, a first mapping between respective containers and respective transaction log files; and
   creating, by the first component, a second mapping between respective containers and respective database resources.

4. The method of claim 3, wherein the recording respective transaction log entries redirected by respective second components in respective containers into respective transaction log files corresponding to respective containers further comprises:
   in response to receiving a request for recording a transaction log entry from a second component of a second container:
      determining, by the first component, a second transaction log file corresponding to the second container based on the first mapping; and
      recording, by the first component, the transaction log entry into the second transaction log file.

5. The method of claim 3, wherein the determining at least one transaction log entry from a first transaction log file corresponding to the first container comprises:
   determining, by the first component, the first transaction log file corresponding to the first container based on the first mapping; and
   reading, by the first component, the at least one transaction log entry from the first transaction log file.

6. The method of claim 3, wherein the retrieving at least one in-doubt transaction corresponding to the first container from a first database corresponding to the first container comprises:
   determining, by the first component, the first database resource corresponding to the first container based on the second mapping;
   retrieving, by the first component, a list of all in-doubt transactions from the first database; and
   determining, by the first component, the at least one in-doubt transaction corresponding to the first container.

7. The method of claim 1, further comprising:
   deleting, by the first component, the at least one transaction log entry from the first log file corresponding to the first container in response to the at least one in-doubt transactions being recovered.

8. A system, comprising:
   a first component with a processing unit in a cloud computing environment; and
   a memory coupled to the processing unit and storing instructions thereon, the instructions, when executed by the processing unit, performing actions including:
      determining whether a first container of a plurality of containers in the cloud computing environment is crashed;
      in response to the first container being crashed:
         determining at least one transaction log entry from a first log file corresponding to the first container;
         retrieving at least one in-doubt transaction corresponding to the first container from a first database corresponding to the first container; and
         comparing the at least one transaction log entry with the at least one in-doubt transaction to determine a transaction recovery action;
      wherein respective second components in respective containers of the plurality of containers:
         add a hook on transaction log requests from the respective containers; and
         redirect the transaction log requests to the first component.

9. The system of claim 8, wherein the actions further include:
   recording respective transaction log entries redirected by respective second components in respective containers into respective transaction log files corresponding to respective containers, the respective log files being stored in a storage.

10. The system of claim 9, wherein the recording respective transaction log entries redirected by respective second components in respective containers into respective transaction log files corresponding to respective containers comprises:
    creating the respective transaction log files corresponding to respective containers in the storage;
    creating a first mapping between respective containers and respective transaction log files; and
    creating a second mapping between respective containers and respective database resources;
    in response to receiving a request for recording a transaction log entry from a second component of a second container:

determining a second transaction log file corresponding to the second container based on the first mapping; and recording the transaction log entry into the second transaction log file.

11. The system of claim 10, wherein the retrieving at least one in-doubt transaction corresponding to the first container from a first database corresponding to the first container comprises:

determining the first database resource corresponding to the first container based on the second mapping;

retrieving a list of all in-doubt transactions from the first database; and determining the at least one in-doubt transaction corresponding to the first container.

12. The system of claim 10, wherein the determining at least one transaction log entry from a first transaction log file corresponding to the first container comprises:

determining, by the first component, the first transaction log file corresponding to the first container based on the first mapping; and reading, by the first component, the at least one transaction log entry from the first transaction log file.

13. The system of claim 8, the actions further including:

deleting the at least one transaction log entry from the first log file corresponding to the first container in response to the at least one in-doubt transactions being recovered.

14. A computer program product, comprising a computer-readable storage medium having program instructions embodied therewith, the program instructions executable by a first component with a processor in a cloud computing environment to cause the processor to perform actions including:

determining whether a first container of a plurality of containers in the cloud computing environment is crashed;

in response to the first container being crashed:

determining at least one transaction log entry from a first log file corresponding to the first container;

retrieving at least one in-doubt transaction corresponding to the first container from a first database corresponding to the first container; and comparing the at least one transaction log entry with the at least one in-doubt transaction to determine a transaction recovery action;

wherein respective second components in respective containers of the plurality of containers:

add a hook on transaction log requests from the respective containers; and redirect the transaction log requests to the first component.

15. The computer program product of claim 14, wherein the actions further include:

recording respective transaction log entries redirected by respective second components in respective containers into respective transaction log files corresponding to respective containers, the respective log files being stored in a storage.

16. The computer program product of claim 15, wherein the recording respective transaction log entries redirected by respective second components in respective containers into respective transaction log files corresponding to respective containers comprises:

creating the respective transaction log files corresponding to respective containers in the storage;

creating a first mapping between respective containers and respective transaction log files; and creating a second mapping between respective containers and respective database resources;

in response to receiving a request for recording a transaction log entry from a second component of a second container:

determining a second transaction log file corresponding to the second container based on the first mapping; and recording the transaction log entry into the second transaction log file.

17. The computer program product of claim 16, wherein the retrieving at least one in-doubt transactions corresponding to the first container from a first database corresponding to the first container comprises:

determining the first database resource corresponding to the first container based on the second mapping;

retrieving a list of all in-doubt transactions from the first database; and determining the at least one in-doubt transactions corresponding to the first container.

18. The computer program product of claim 16, wherein the determining at least one transaction log entry from a first transaction log file corresponding to the first container comprises:

determining, by the first component, the first transaction log file corresponding to the first container based on the first mapping; and reading, by the first component, the at least one transaction log entry from the first transaction log file.

19. The computer program product of claim 14, the actions further including:

deleting the at least one transaction log entry from the first log file corresponding to the first container in response to the at least one in-doubt transaction being recovered.

* * * * *